(12) United States Patent
Lim et al.

(10) Patent No.: US 8,401,280 B2
(45) Date of Patent: Mar. 19, 2013

(54) DEVICE FOR IMPROVING STEREO MATCHING RESULTS, METHOD OF IMPROVING STEREO MATCHING RESULTS USING THE DEVICE, AND SYSTEM FOR RECEIVING STEREO MATCHING RESULTS

(75) Inventors: Eul Gyoon Lim, Daejeon (KR); Ji Ho Chang, Daejeon (KR); Ho Chul Shin, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 270 days.

(21) Appl. No.: 12/971,793

(22) Filed: Dec. 17, 2010

(65) Prior Publication Data

US 2011/0188740 A1  Aug. 4, 2011

(30) Foreign Application Priority Data

Dec. 21, 2009 (KR) .................. 10-2009-0127699
Jun. 1, 2010 (KR) .................. 10-2010-0051852

(51) Int. Cl.
*G06K 9/00* (2006.01)
*G06K 9/40* (2006.01)

(52) U.S. Cl. ...................... 382/154; 382/275
(58) Field of Classification Search ................ None
See application file for complete search history.

(56) References Cited

U.S. PATENT DOCUMENTS

| 7,508,994 B2 | 3/2009 | Wang et al. |
| 7,522,761 B2 | 4/2009 | Prakash et al. |
| 2005/0232509 A1* | 10/2005 | Blake et al. .................. 382/275 |

FOREIGN PATENT DOCUMENTS

| JP | 2003-153004 | 5/2003 |
| KR | 10-2010-0019804 | 2/2010 |

OTHER PUBLICATIONS

Perez, M.; Pagliari, C.; Dennis, T.; , "Statistical analyses of disparity maps and disparity compensated residuals in the presence of occlusions," Image Processing, 2001. Proceedings. 2001 International Conference on , vol. 3, No., pp. 911-914 vol. 3, 2001 doi: 10.1109/ICIP.2001.958272 URL: http://ieeexplore.ieee.org/stamp/stamp.jsp?tp=&arnumber=95827.*

(Continued)

*Primary Examiner* — Stephen R Koziol
*Assistant Examiner* — Jonathan S Lee
(74) *Attorney, Agent, or Firm* — Staas & Halsey LLP

(57) ABSTRACT

Provided is a device for improving stereo matching results. The device for improving stereo matching results includes: a stereo camera unit outputting binocular disparity images by using binocular disparity between two images preprocessed according to a plurality of preprocessing conditions; a discrete cosine transform (DCT) unit generating DCT coefficients by performing DCT on the binocular disparity images; a streak estimation unit receiving the DCT coefficients and estimating amounts of streaks distributed on a screen by using AC coefficients, including streak patterns, of the DCT coefficients; a condition estimation unit estimating a preprocessing condition, corresponding to the smallest amount of streaks of the estimated amounts of streaks, of the plurality of preprocessing conditions, as an optimal condition, and a streak removal unit generating binocular disparity images without the streaks by changing predetermined AC coefficients of the DCT coefficients and performing inverse DCT on the changed DCT coefficients.

16 Claims, 12 Drawing Sheets

OTHER PUBLICATIONS

Pagliari, C.L.; Dennis, T.J.; , "Stereo disparity computation in the DCT domain using genetic algorithms," Image Processing, 1997. Proceedings., International Conference on , vol. 3, No., pp. 256-259 vol. 3, Oct. 26-29, 1997 doi: 10.1109/ICIP.1997.632080 URL: http://ieeexplore.ieee.org/stamp/stamp.jsp?tp=&arnumber=632080&isnumber=13718.*

Xun Sun; Xing Mei; Shaohui Jiao; Mingcai Zhou; Haitao Wang; , "Stereo Matching with Reliable Disparity Propagation," 3D Imaging, Modeling, Processing, Visualization and Transmission (3DIMPVT), 2011 International Conference on , vol., No., pp. 132-139, May 16-19, 2011 doi: 10.1109/3DIMPVT.2011.24 URL: http://ieeexplore.ieee.org/stamp/stamp.jsp?tp=&arn.*

"Low Complexity Streak Noise Reduction for Mobile TV Using Line Selective Interpolation of Riled Information" by Markus Friebe et al. On Proceedings International Conference on Image Processing vol. 3, as of Sep. 11-14, 2005.

* cited by examiner

DEVICE FOR IMPROVING STEREO MATCHING RESULTS, METHOD OF IMPROVING STEREO MATCHING RESULTS USING THE DEVICE, AND SYSTEM FOR RECEIVING STEREO MATCHING RESULTS

CROSS-REFERENCE TO RELATED APPLICATIONS

This application claims priority under 35 U.S.C. §119 to Korean Patent Application No. 10-2009-0127699, filed on Dec. 21, 2009, and Korean Patent Application No. 10-2010-0051852, filed on Jun. 1, 2010 in the Korean Intellectual Property Office, the disclosure of which are incorporated herein by reference in its entirety.

TECHNICAL FIELD

The present invention relates to a device for improving stereo matching results and a method using the device, and more particularly, to a device for improving the quality of binocular disparity images resulting from stereo matching, and a method using the device.

BACKGROUND

There are various methods of calculating the binocular disparity between two images resulting from stereo matching. Examples of existing methods of calculating binocular disparity include a scan-line smoothness optimization method and a dynamic programming stereo (DPS) method which are implemented using ASIC and perform optimization of one-dimension energy.

However, these methods have disadvantages in that streak noise occurs in binocular disparity images due to errors occurring in scan line units of the images, and the degree of the noise depends on the arrangement condition of binocular cameras.

FIG. 1 is a view showing a binocular disparity image with streaks according to the related art, and FIG. 2 is a view showing an 8-by-8-sized block of the binocular disparity image shown in FIG. 1, in which many streaks are present.

Streaks occurring in a binocular disparity image obtained by using optimization of one-dimension energy have features in which they are formed in a horizontal direction, as shown in FIG. 1, and occur more frequently in the boundary of an object than in the central part of the object, as shown in FIG. 2.

FIG. 3 is a view showing a result image obtained by performing Fourier transform on the binocular disparity image shown in FIG. 1.

Referring to FIG. 3, if Fourier transform is performed on an image having horizontal streaks and the transformed image is observed in log scale, a vertical component strongly appears. However, since the length of the individual streaks are not long as shown in FIGS. 1 and 2, many horizontal high-frequency components also appear.

Existing techniques of removing such streaks in an image detect the streaks appearing as straight lines in a Fourier domain and remove the detected streaks by using linear regression analysis.

However, these existing techniques are limited to removing of streaks crossing an entire original image. Since short streaks locally present in an image have a great many of frequency components along the progress direction of the streaks as shown in FIG. 4, the streaks occupy a very wide range in a Fourier domain as shown in FIG. 5. Therefore, the short streaks locally present in the image cannot be removed by the linear regression analysis used by the existing techniques.

In other existing techniques of reducing streaks crossing an entire screen, since many calculations are required for a substantial number of pixels in images are required, the process speed is low and short streaks locally present in images also cannot be removed.

SUMMARY

An exemplary embodiment of the present invention provides a device for improving stereo matching results, that includes: a stereo camera unit outputting binocular disparity images between two images preprocessed according to a plurality of preprocessing conditions; a discrete cosine transform (DCT) unit generating DCT coefficients by performing discrete cosine transform (DCT) on the binocular disparity images; a streak estimation unit receiving the generated DCT coefficients and estimating amounts of streaks distributed on a screen by using AC coefficients, including streak pattern components in a predetermined direction, of the DCT coefficients; a condition estimation unit estimating a preprocessing condition, corresponding to the smallest amount of streaks of the estimated amounts of streaks, of the plurality of preprocessing conditions, as an optimal condition, and a streak removal unit generating binocular disparity images without the streaks according to the optimal condition by changing predetermined AC coefficients of the DCT coefficients obtained by the discrete cosine transform unit and performing inverse discrete cosine transform on the changed DCT coefficients.

Another exemplary embodiment of the present invention provides a method of improving stereo matching results, that includes: outputting binocular disparity images between two images preprocessed according to a plurality of preprocessing conditions; generating discrete cosine transform (DCT) coefficients by performing discrete cosine transform (DCT) on the binocular disparity images; estimating amounts of streaks distributed on a screen by using AC coefficients, corresponding to streak patterns, of the generated DCT coefficients; estimating a preprocessing condition, corresponding to the smallest amount of streaks of the estimated amounts of streaks, of the plurality of preprocessing conditions, as an optimal condition, and generating the binocular disparity images without the streaks according to the optimal condition by changing the AC coefficients corresponding to the streak patterns and performing inverse discrete cosine transform on the changed DCT coefficients.

Yet another exemplary embodiment of the present invention provides a system for receiving stereo matching results, that includes: a compression image decoder receiving an original image and binocular disparity images including streak patterns as an compressed encoded bit stream, and restoring the binocular disparity images with less streak patterns by restoring discrete cosine transform (DCT) coefficients by decoding the bit stream, changing AC coefficients of blocks, corresponding to the binocular disparity images of the restored DCT coefficients, and performing inverse discrete cosine transform on the changed DCT coefficients; and a de-blocking filter de-blocking blocks included in the restored binocular disparity images.

Other features and aspects will be apparent from the following detailed description, the drawings, and the claims.

DETAILED DESCRIPTION OF EMBODIMENTS

Figure 1:
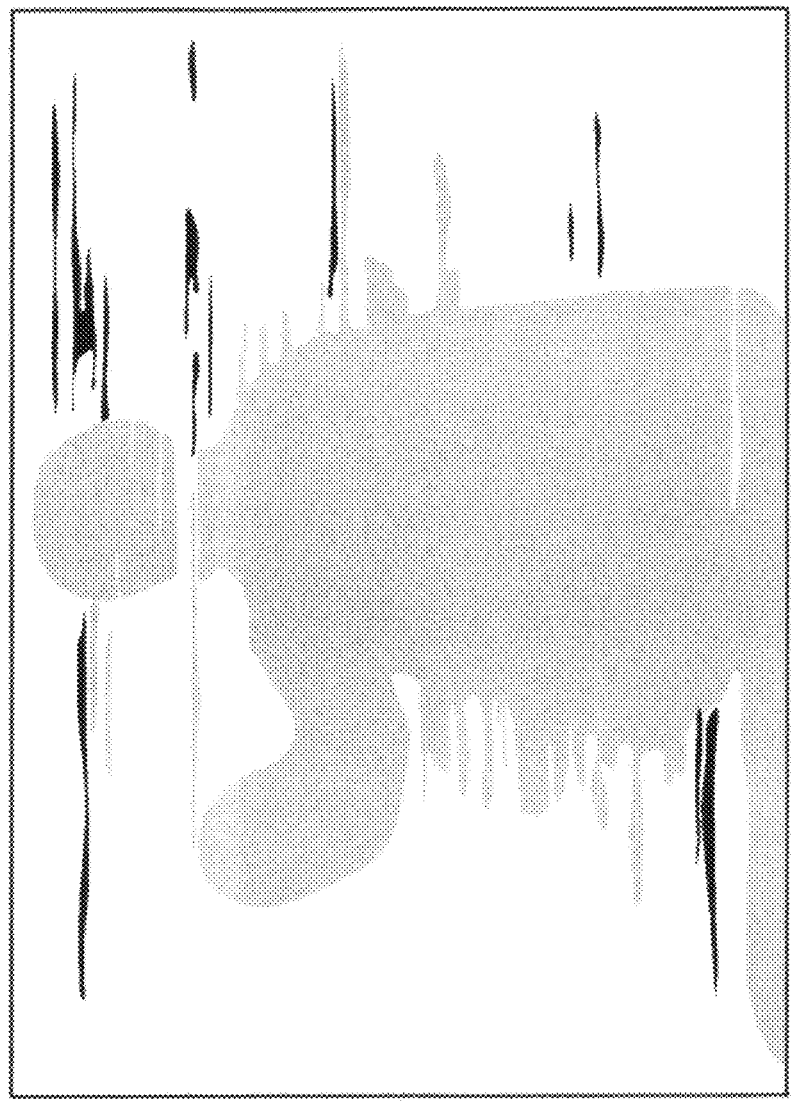
FIG. 1 is a view showing a binocular disparity image with streaks according to the related art.
Figure 2:
FIG. 2 is a view showing an 8-by-8-sized block of the binocular disparity image shown in FIG. 1, in which many streaks are present.
Figure 3:
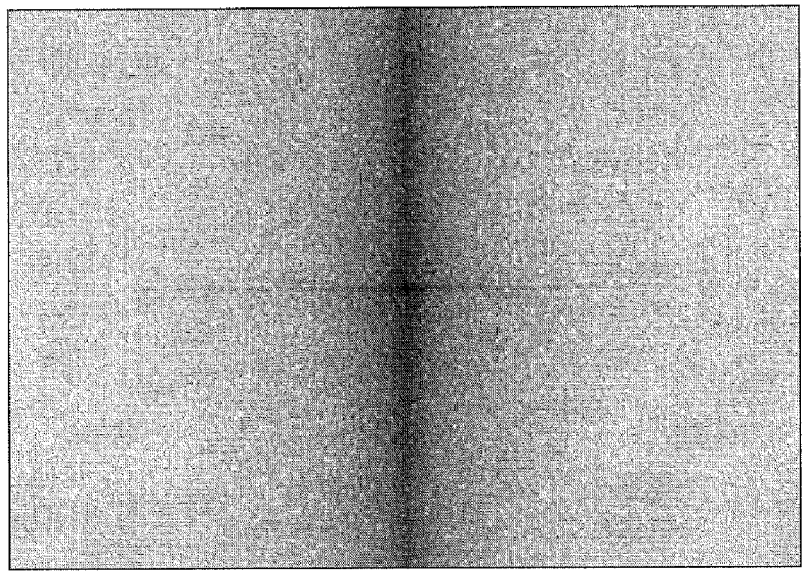
FIG. 3 is a view showing a result image obtained by applying Fourier transform to the binocular disparity image shown in FIG. 1.
Figure 4:
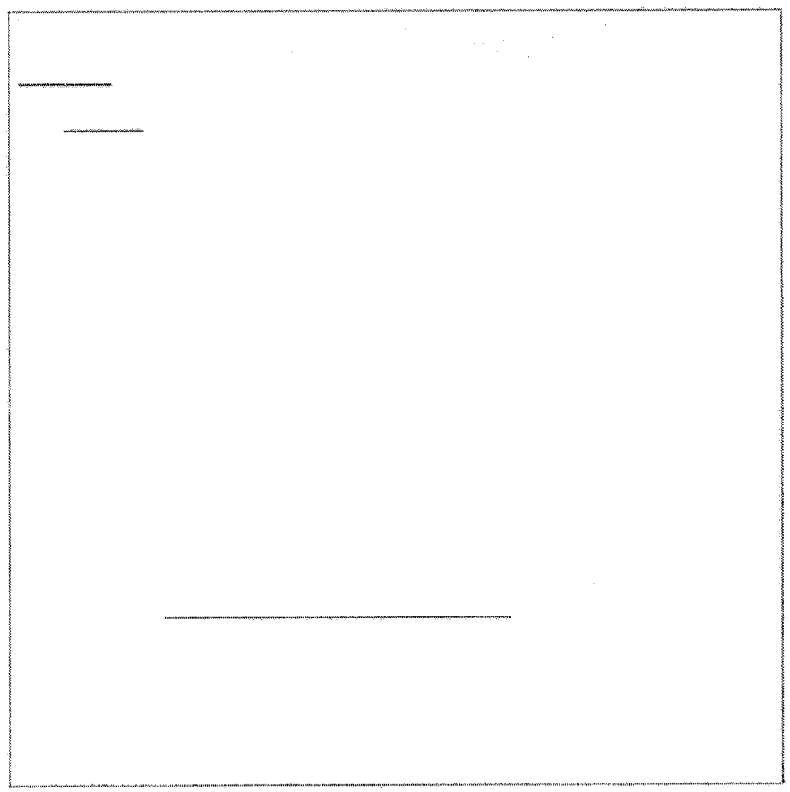
FIG. 4 is a view showing an image having short horizontal streaks.
Figure 5:
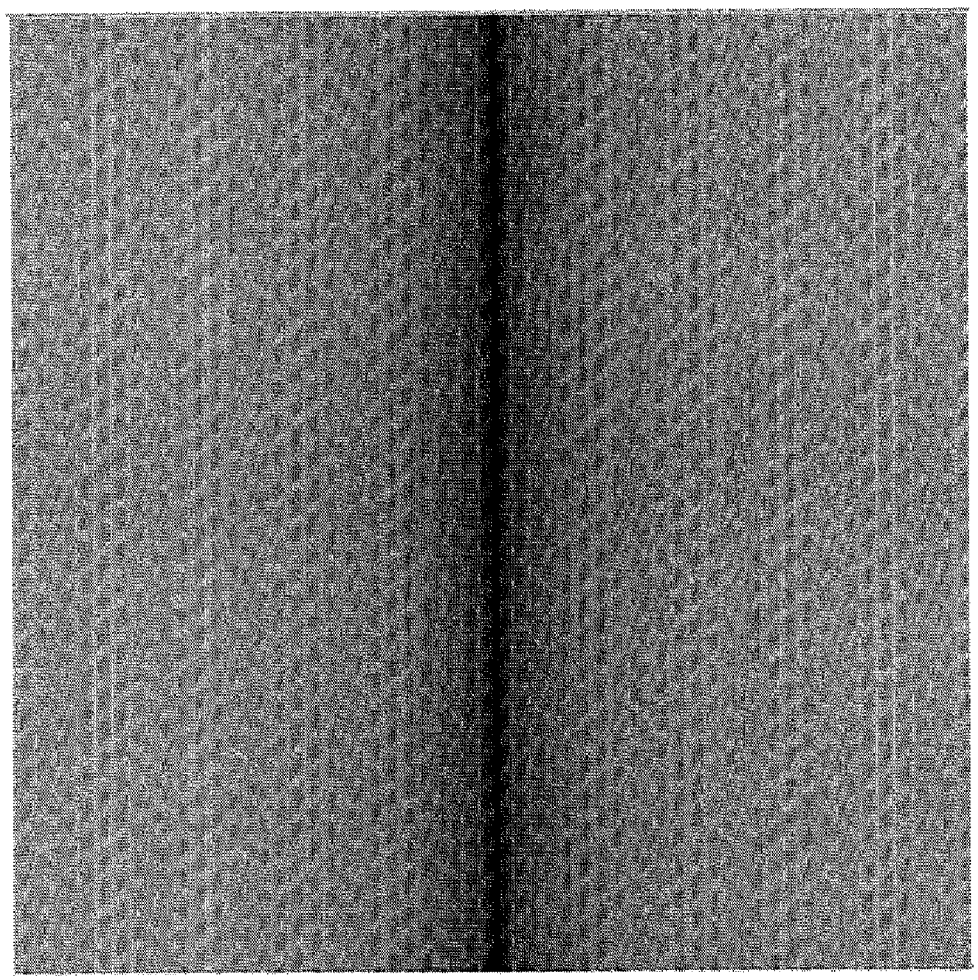
FIG. 5 is a view showing the Fourier transform result of the short horizontal streaks shown in FIG. 4.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 6:
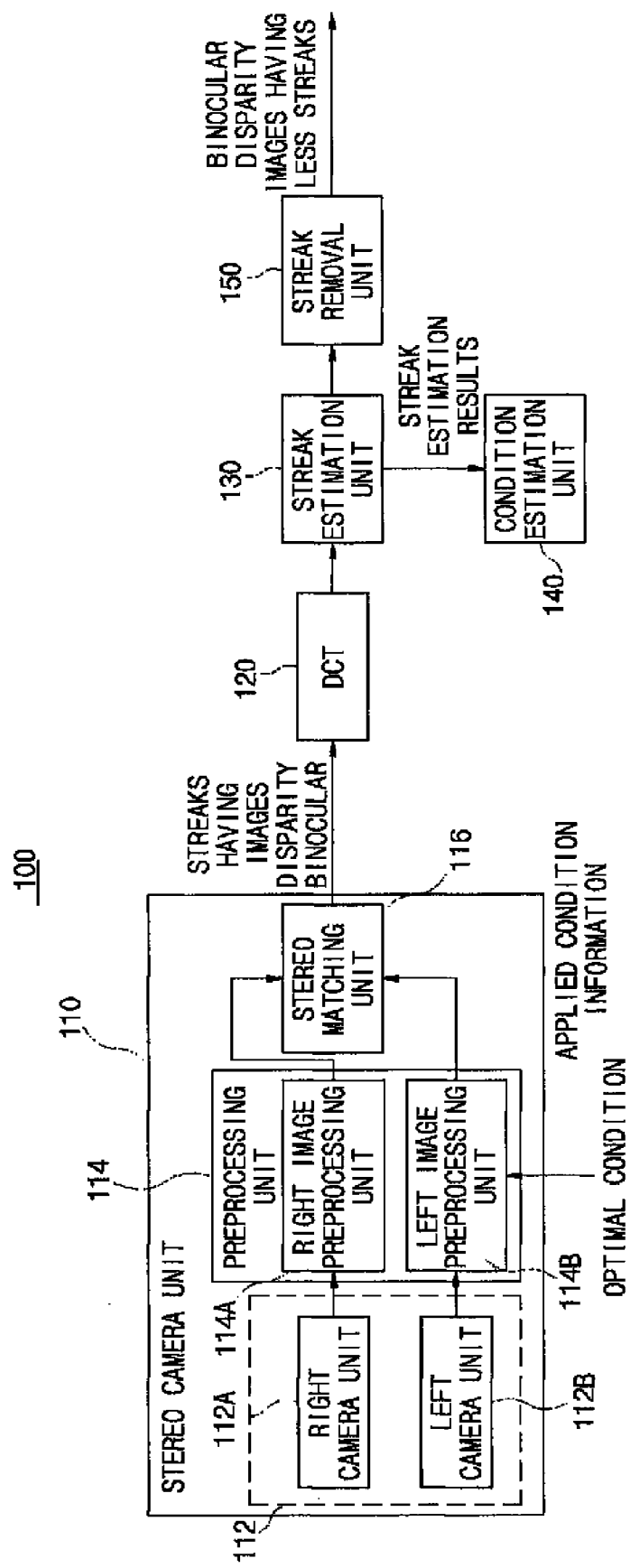
FIG. 6 is a block diagram showing a device for improving stereo matching results according to an exemplary embodiment of the present invention.

FIG. 6 is a block diagram showing a device for improving stereo matching results according to an exemplary embodiment of the present invention.

Referring to FIG. 6, a device 100 for improving stereo matching results according to the exemplary embodiment of the present invention includes a stereo camera unit 110, a discrete cosine transformer (hereinafter, referred to as "DCT") 120, a streak estimation unit 130, a condition estimation unit 140, and a streak removal unit 150.

The stereo camera unit 110 generates a binocular disparity image by calculating the binocular disparity between two images. In order to generate such a binocular disparity image, the stereo camera unit 110 includes a camera unit 112, a preprocessing unit 114, and a stereo matching unit 116. The camera unit 112 includes a right camera unit 112A and a left camera unit 112B having optical axes aligned in parallel with each other. The right camera unit 112A generates a right image, and the left camera unit 112B generates a left image.

The preprocessing unit 114 includes a right image preprocessing unit 114A which receives the right image and performs preprocessing on the right image, and a left image preprocessing unit 114B which receives the left image and performs preprocessing on the left image. This preprocessing may includes a process of independently adjusting the brightness of two images, a histogram smoothing process, an image translating process, an image rotating process, etc., and since these processes are performed before a stereo matching process, the performance of stereo matching carried out in the stereo matching unit 116 can be improved.

The stereo matching unit 116 receives the preprocessed right image and left image, calculates the binocular disparity between the images by using an algorithm such as a dynamic programming technique, and generates and outputs a binocular disparity image showing the calculated binocular disparity as brightness information. In this case, the stereo matching unit 116 may output binocular disparity images having different error distributions according to preprocessing conditions. If a one-dimension energy optimization technique which can be implemented as hardware is applied to a binocular disparity image having an error distribution, the error distribution is generally presented in a streak form. Hereinafter, binocular disparity images having different streak distributions according to preprocessing conditions will be described with reference to FIG. 7.

Figure 7:
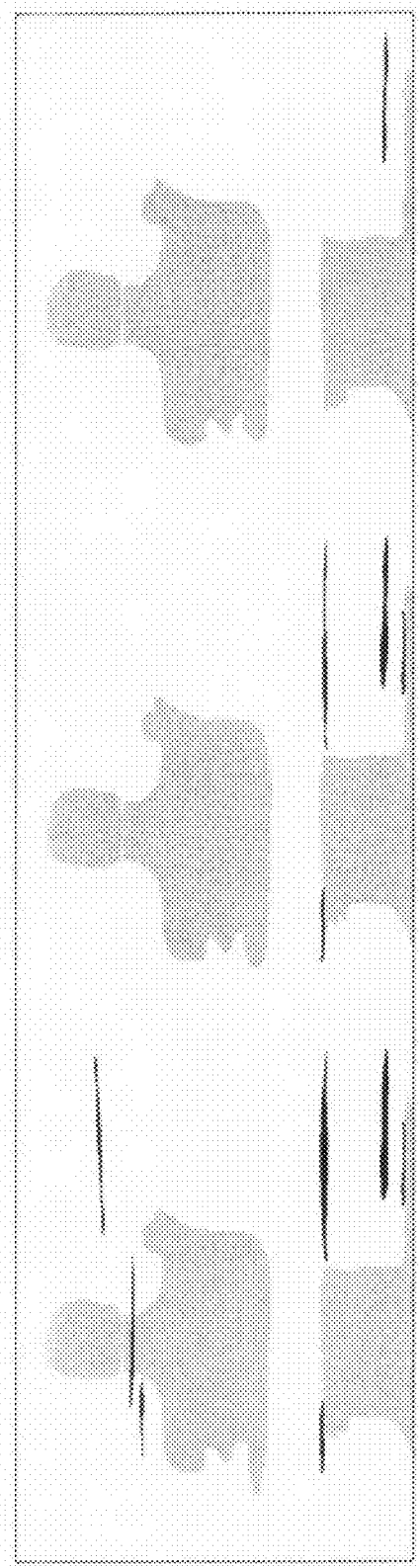
FIG. 7 is a view showing a binocular disparity image output from the stereo matching unit shown in FIG. 6.

FIG. 7 is a view showing an example of binocular disparity images having different streak distributions output from the stereo matching unit shown in FIG. 6.

In FIG. 7, three binocular disparity images CASE1, CASE2, and CASE3 having streak distributions different from one another according to the preprocessing conditions different from one another are shown. In this exemplary embodiment, the preprocessing conditions different from one another are vertical alignment positions different from one another.

Specifically, a binocular disparity image CASE1 is a binocular disparity image obtained by performing matching by translating the left image upward by one row such that the (i+1)-th horizontal line left[i+1] from the top of the left image is matched with the i-th horizontal line right[i] from the top of the right image.

A binocular disparity image CASE 2 is a binocular disparity image obtained by performing matching by using the left image as it is such that the i-th horizontal line left[i] from the top of the left image is matched with the i-th horizontal line right[i] from the top of the right image.

A binocular disparity image CASE 3 is a binocular disparity image obtained by performing matching by translating the left image downward by one row such that the (i−1)-th horizontal line left[i−1] of the left image is matched with the i-th horizontal line right[i] of the right image.

In FIG. 7, the most streaks appear in the binocular disparity image CASE 1, and the least streaks appear in the binocular disparity image CASE 3.

In this exemplary embodiment, the vertical alignment position which is changeable has been described as an example of the preprocessing conditions, and other examples of the preprocessing conditions may include the exposure value of the left camera with respect to the exposure value of the right camera, the luminance gain of the left camera with respect to the luminance gain of the right camera, etc., which are factors having effects on binocular disparity images and are variously changeable.

Again referring to FIG. 6, the DCT 120 divides the binocular disparity image into blocks having a predetermined size. Next, the DCT 120 performs discrete cosine transform on each of the divided blocks and outputs the DCT coefficients of the individual blocks. For example, the DCT 120 divides the input binocular disparity image into k (which is a natural number) number of 8 (which is the number of pixels in the vertical direction) by 8 (which is the number of pixels in the horizontal direction) block images, and calculates the DCT (discrete cosine transform) coefficients Y1 to Yk by performing discrete cosine transform on the individual block images X1 to Xk.

The calculated DCT (discrete cosine transform) coefficients Yk can be expressed by the following Equation 1.

$$Y_{k_{x,y}} = C_x C_y \sum_{i=0}^{N} \sum_{j=0}^{N} X_{k_{i,j}} \cos\frac{\pi(2j+1)y}{2N} \cos\frac{\pi(2i+1)x}{2N}$$ [Equation 1]

$$C_i = \sqrt{\frac{1}{N}} \quad (i = 0)$$

$$C_i = \sqrt{\frac{2}{N}} \quad (0 < i \le N)$$

$$N = 7$$

Here, i is a vertical pixel coordinate in an input binocular disparity image block Xk, and j is a horizontal pixel coordinate in the input binocular disparity image block Xk. Further, x and y represent an index of a DCT coefficient.

Figure 8:
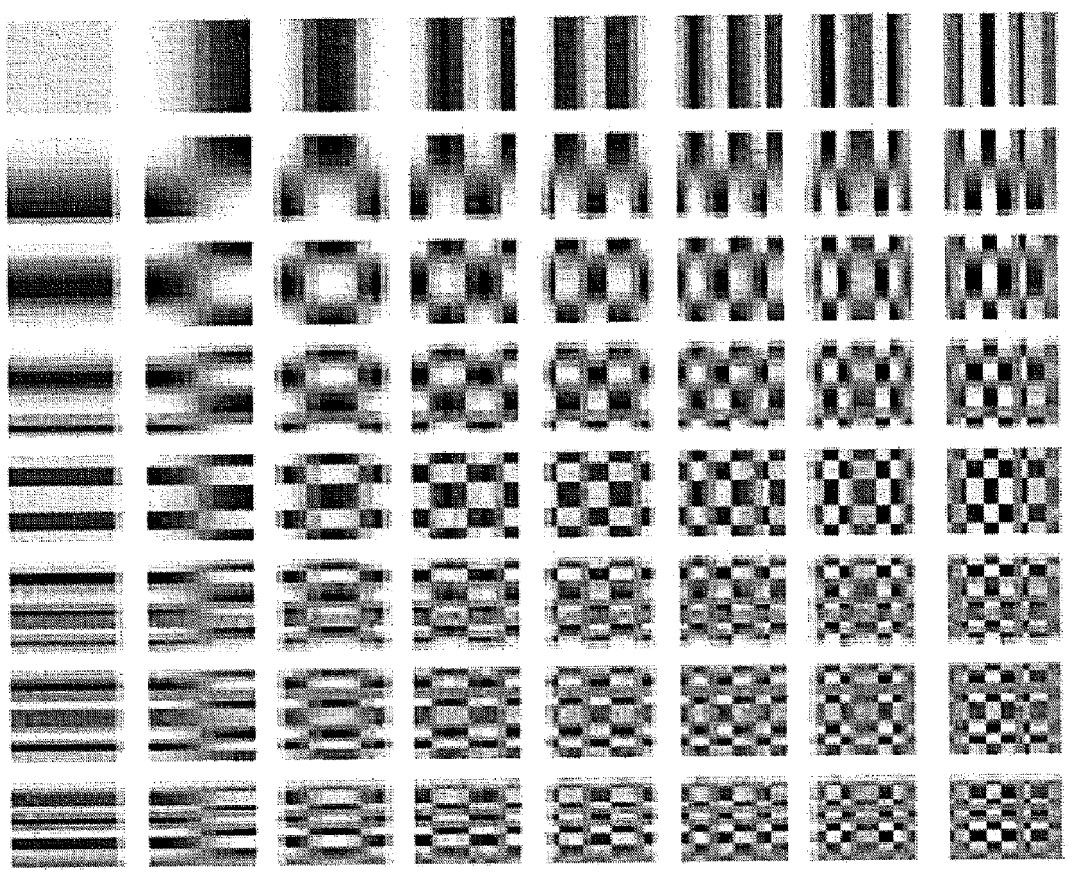
FIG. 8 is a view showing a basic pattern of an 8 by 8 DCT.

FIG. 8 is a view showing a basic pattern of an 8 by 8 DCT, and shows components represented by $Y_{k_{x,y}}$ (wherein the subscript x has a value of 0 to 7 corresponding to the uppermost row to the lowermost row and the subscript y has a value of 0 to 7 corresponding to the leftmost column to the rightmost column) of Equation 1.

As shown in FIG. 8, the DCT coefficient $Y_{k_{x,y}}$ of the block Xk can be used as a measure of how many noise pattern components exist in the block Xk.

A DCT (discrete cosine transform) process has the following advantages as compared to a discrete Fourier transform (DFT) process.

First, in the discrete Fourier transform (DFT) process, in a process of making a periodic image, high-frequency components occur by discontinuity at the boundary between the left and right sides or between the upper and lower sides of the image. In contrast, in the discrete cosine transform technique, in a process of making a periodic image, since the left and right sides or the upper and lower sides of the image are made to be symmetrical, discontinuity does not occur, and high-frequency components by discontinuity does not occur. Therefore, if the DCT is used, the high-frequency components of streak noise can be effectively detected as compared to existing techniques for detecting high-frequency components corresponding to streak components in binocular disparity images by using the Fourier transform.

Second, while the DFT always generates magnitude and phase information, the DCT does not generate phase information. In detecting streaks of binocular disparity images, since phase information is unnecessary, the DCT is more advantageous than the DFT.

Third, if an image is divided into small blocks having an 8 by 8 or 16 by 16 size and the discrete cosine transform process is performed on the individual blocks, the process has an advantage in which a high-frequency component corresponding to a short streak is included in only a corresponding block and does not influence the neighboring blocks, unlike existing techniques with DFT for detecting streaks.

Again referring to FIG. 6, the streak estimation unit 130 receives the individual DCT coefficients of k number of blocks from the DCT 120 and estimates the amount of streaks distributed on a screen by using AC coefficients. The 0-th order coefficient ($Y_{k_{x,y}}$ when x and y are 0) of the DCT coefficients is referred to a DC coefficient since it is not a cosine function, and the other coefficients except for the 0-th order coefficient are referred to as AC coefficients.

Among the AC coefficients, coefficients when y is 0 are coefficients representing a horizontal line well, and in a case of performing the discrete cosine transform on the k number of 8 by 8 block images, only a frequency component $Y_{k_{7,0}}$ corresponding the thinnest horizontal line in every k number of blocks may be used. That is, in the case of dividing the binocular disparity image into 8 by 8 blocks, the streak estimation unit 130 estimates the amount of streaks distributed on the screen by using the AC coefficients which correspond to the bottom left (see FIG. 8) of each block corresponding to a streak pattern and have the highest frequency components.

The amount of streaks with respect to the k number of blocks, that is, a streak estimation function $f$ can be expressed by, for example, the sum of absolute values as the following Equation 2.

$$f = \sum_{k=1}^{K} |Y_{k_{7,0}}|$$ [Equation 2]

Streak estimation function $f$ calculates constituent estimation results as follows with respect to the binocular disparity images CASE1, CASE2, and CASE3 of FIG. 7 and binocular disparity images of the next frames.

Figure 9:
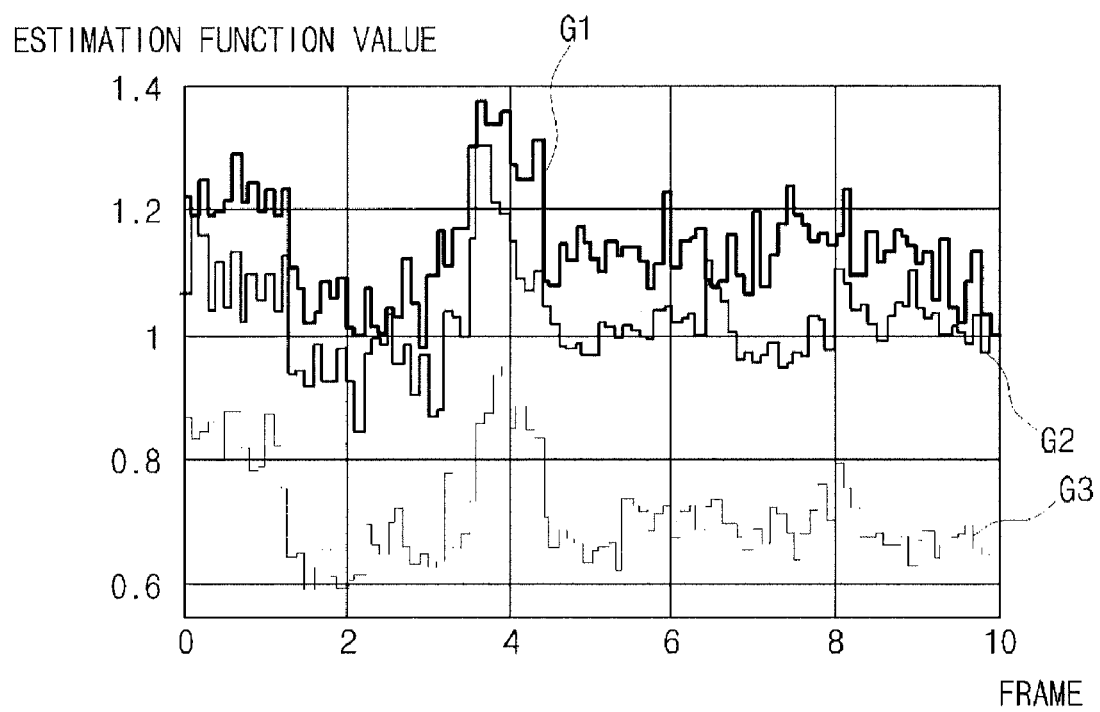
FIG. 9 is a graph showing output values of a streak estimation unit shown in FIG. 6 with respect to three kinds of binocular disparity images having streak distributions different from one another according to preprocessing conditions different from one another.

FIG. 9 is a graph showing output values of the streak estimation unit shown in FIG. 6 with respect to three kinds of binocular disparity images having streak distributions different from one another according to preprocessing conditions different from one another.

In FIG. 9, first to third graphs G1, G2, and G3 are shown, and the first to third graphs G1, G2, and G3 are graphs showing output values of the streak estimation unit 130 with respect to the binocular disparity images CASE1, CASE2, and CASE3 of FIG. 7, respectively. Therefore, the first graph G1 shows the output values of the streak estimation unit 130 (of FIG. 6) with respect to binocular disparity images in which the largest amount of streaks are distributed, and the third graph G3 shows the output values of the streak estimation unit 130 with respect to binocular disparity images in which the smallest amount of streaks are distributed.

Again referring to FIG. 6, the condition estimation unit 140 separately stores the output values output from the streak estimation unit 130 according to the preprocessing conditions based on the vertical alignment positions. The condition estimation unit 140 compares the stored output values to one another, and outputs the preprocessing condition of a case where the lowest output value has been output as an optimal condition. That is, in the case of FIG. 9, the condition estimation unit 140 determines the preprocessing condition which has been applied to the third graph G3 having a distribution of output values consistently lower than the other graphs G1 and G2, that is, to the binocular disparity image CASE3 of FIG. 7 as the optimal condition, and estimates the binocular disparity image corresponding to the optimal condition, that is, the binocular disparity image CASE3 of FIG. 7 as an optimal binocular disparity image.

According to the estimation results by the condition estimation unit 140, the streak removal unit 150 of FIG. 6 receives the result values which the DCT 120 has obtained by performing the discrete cosine transform on the optimal binocular disparity images generated in the stereo matching unit 116, and changes AC coefficients of the result values corresponding to a predetermined condition to 0 or a value close to 0 (or deletes the AC coefficients of the result values corresponding to the predetermined condition). Next, inverse discrete cosine transform is performed on the changed DCT coefficients, thereby reconstituting the images.

Figure 10:
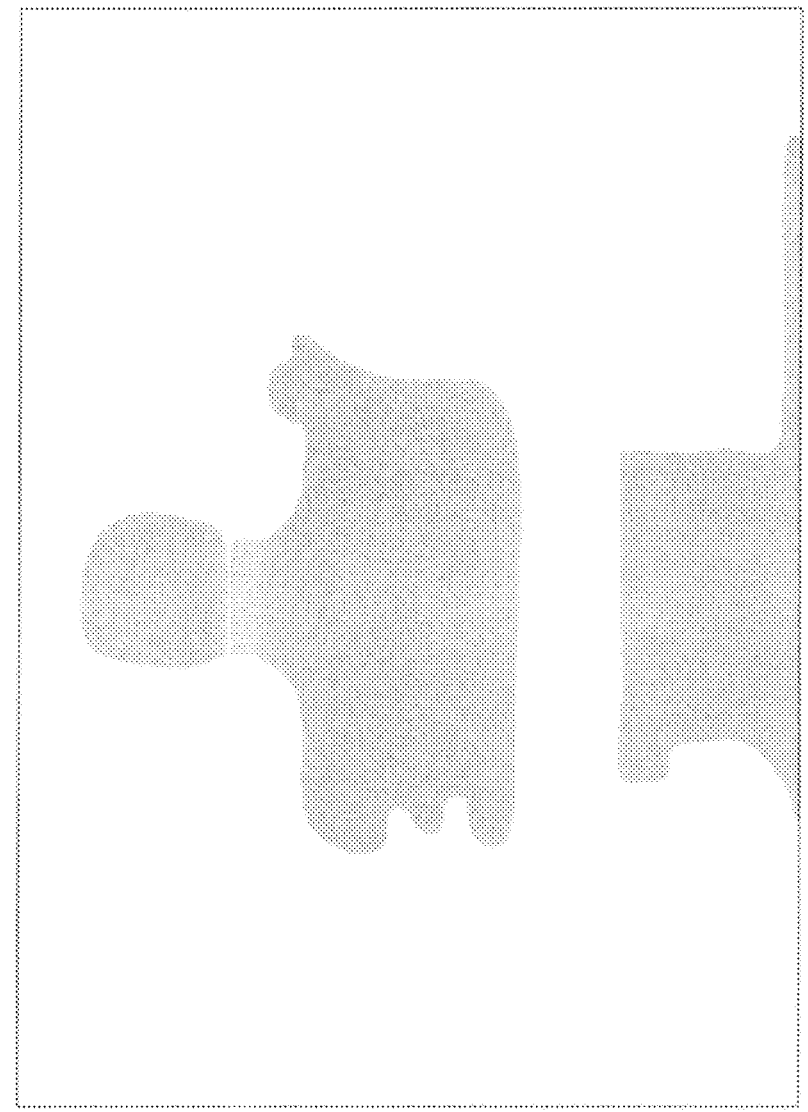
FIG. 10 is a view showing a binocular disparity image having a less amount of streaks obtained by a streak removal unit shown in FIG. 6.

FIG. 10 is a view showing a binocular disparity image having a less amount of streaks obtained by the streak removal unit shown in FIG. 6.

Referring to FIG. 10, it can be seen that the binocular disparity image obtained by changing some AC coefficients of the DCT coefficients of the binocular disparity image CASE3 of FIG. 7 and performing the inverse discrete cosine transform on the changed DCT coefficients by the streak removal unit 150 has a less amount of streak noise as compared to the binocular disparity image CASE3 of FIG. 7.

Meanwhile, since the binocular disparity image obtained by the streak removal unit 150 is a result of a block unit calculation, the block boundaries may be noticeable in the binocular disparity image obtained in the streak removal unit 150. Therefore, the device for improving stereo matching results according to the exemplary embodiment of the present invention may further include a de-blocking filter (not shown) for performing a de-blocking process on the boundary of each block.

Figure 11:
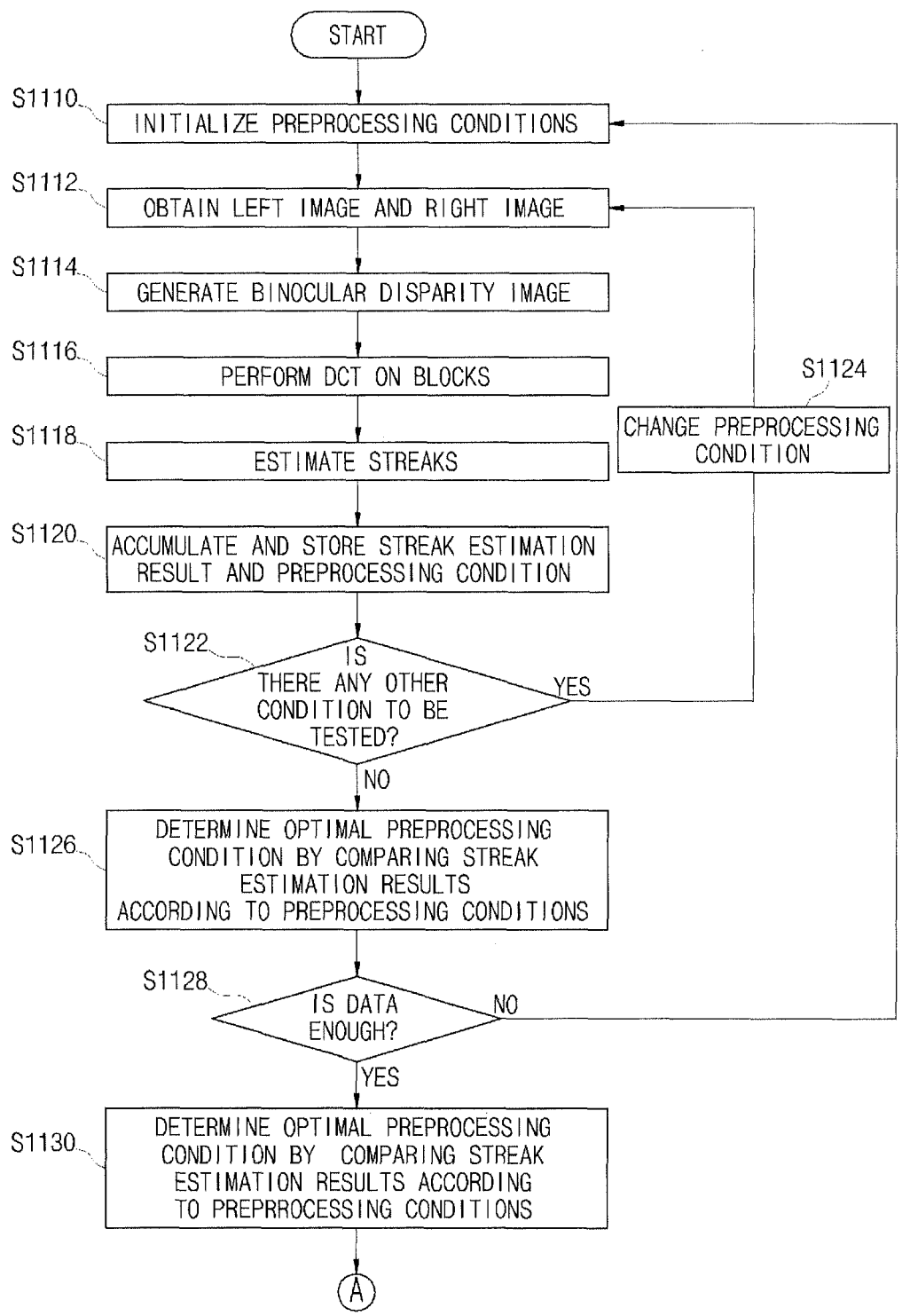
FIGS. 11 and 12 are flow charts showing a method of improving stereo matching results according to an exemplary embodiment of the present invention.
Figure 12:
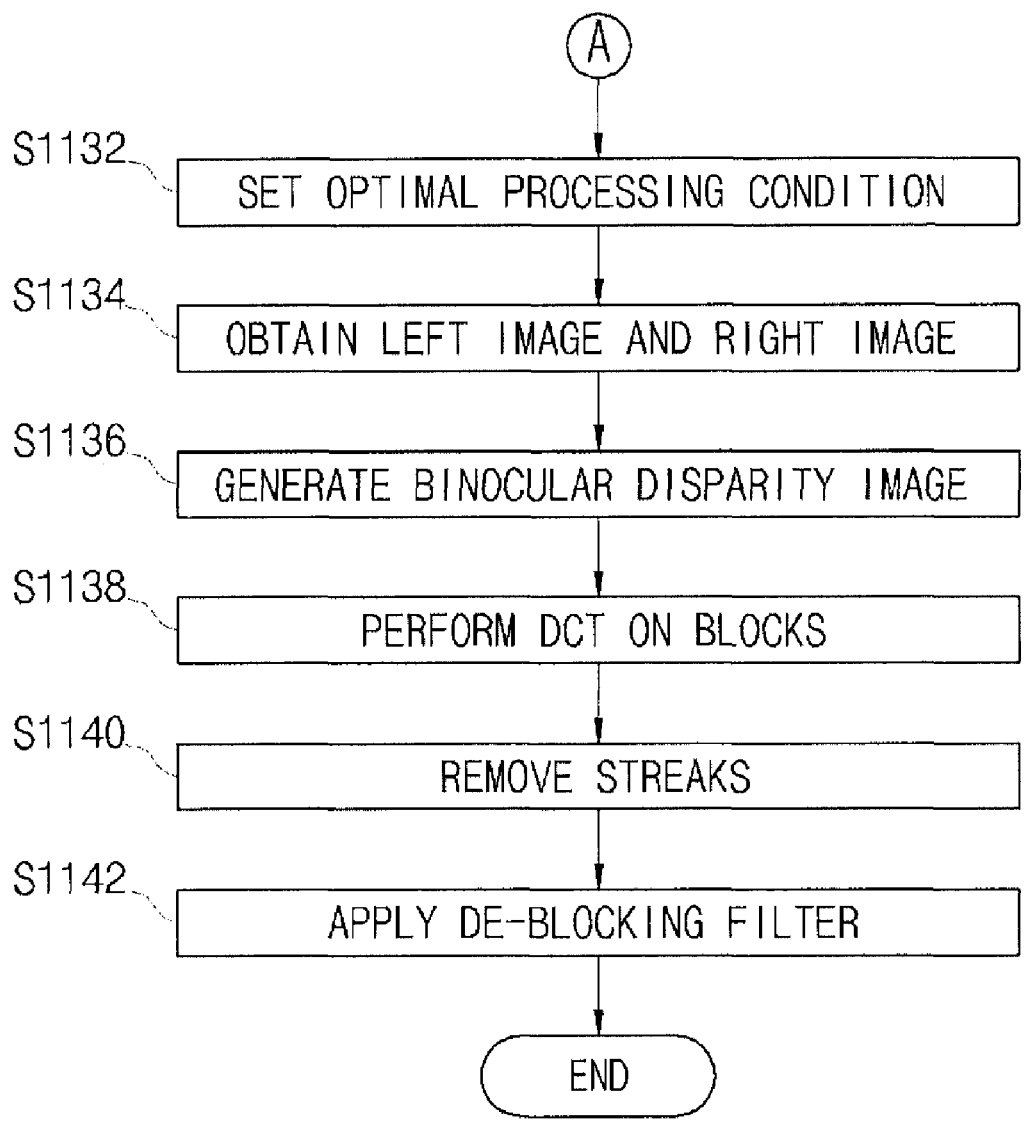

FIGS. 11 and 12 are flow charts showing a method of improving stereo matching results according to an exemplary embodiment of the present invention. In order to promote the understanding of explanation, FIG. 6 is also referred.

Referring to FIGS. 6 and 11, first, in order to output a binocular disparity image, a predetermined preprocessing condition is initialized in the stereo camera unit 110 (S1110).

Next, a right image and a left image are obtained by the right camera unit 112A and the left camera unit 112B of the stereo camera unit 110, respectively (S1112).

Subsequently, preprocessing is performed on the obtained right image and left image according to the predetermined preprocessing condition. A stereo matching process using binocular disparity between the preprocessed right image and left image is performed, and a resulting binocular disparity image is generated (S1114). In this case, the preprocessing condition is variously operated. Examples of the operation of the preprocessing condition include an operation influencing the binocular disparity image such as a condition change according to the vertical alignment position between both images, a change of a variable of the exposure value of the left camera unit with respect to the exposure value of the right camera unit or the exposure value of the right camera unit with respect to the exposure value of the left camera unit, a change of the luminance gain of the left camera unit with respect to the luminance gain of the right camera or the luminance gain of the right camera unit with respect to the luminance gain of the left camera, etc.

Next, the generated binocular disparity image is divided into blocks having a predetermined size, and a discrete cosine transform process is performed on each of the divided blocks (S1116).

Subsequently, streak estimation is performed on each block having been subject to the discrete cosine transform (S1118), and the streak estimation results and the preprocessing condition are accumulated and stored (S1120).

Next, if there are remaining preprocessing conditions, the current preprocessing condition is changed to any one of the remaining preprocessing conditions (S1124), and the processes (S1110, S1112, S1114, S1116, S1118, and S1120) are performed again according to the changed preprocessing condition. If there are no remaining preprocessing conditions, the amounts of streaks of the binocular disparity images to which all preprocessing conditions have been applied are estimated, and an optimal preprocessing condition is determined from the estimation results (S1126).

Next, if data is not enough (S1128), the procedure returns to the first process (S1110), and if data is enough (S1128), an optimal preprocessing condition is determined by comparing streak estimation results according to the preprocessing conditions (S1130), and a left image and a right image are generated in the camera unit 112 of the stereo camera unit 110 of FIG. 6 according to the determined optimal preprocessing condition (S1134).

Then, a binocular disparity image according to the optimal preprocessing condition is generated by using the binocular disparity between the generated left image and right image (S1136), and the generated binocular disparity image is divided into block images having a predetermined size (8 by 8), and a discrete cosine transform process is performed on the divided block images (S1138).

Next, some AC coefficients of the DCT coefficients of the binocular disparity image having been subject to the discrete cosine transform are changed by the streak removal unit 150 of FIG. 6, an inverse discrete cosine transform process is performed on the changed DCT coefficients, and a binocular disparity image having a less amount of streak noise is generated according to the performance result (S1140).

Thereafter, a de-blocking process is performed on the boundary of each block (S1142) since the binocular disparity image obtained by the streak removal unit 150 is a result image of a block unit calculation.

Figure 13:
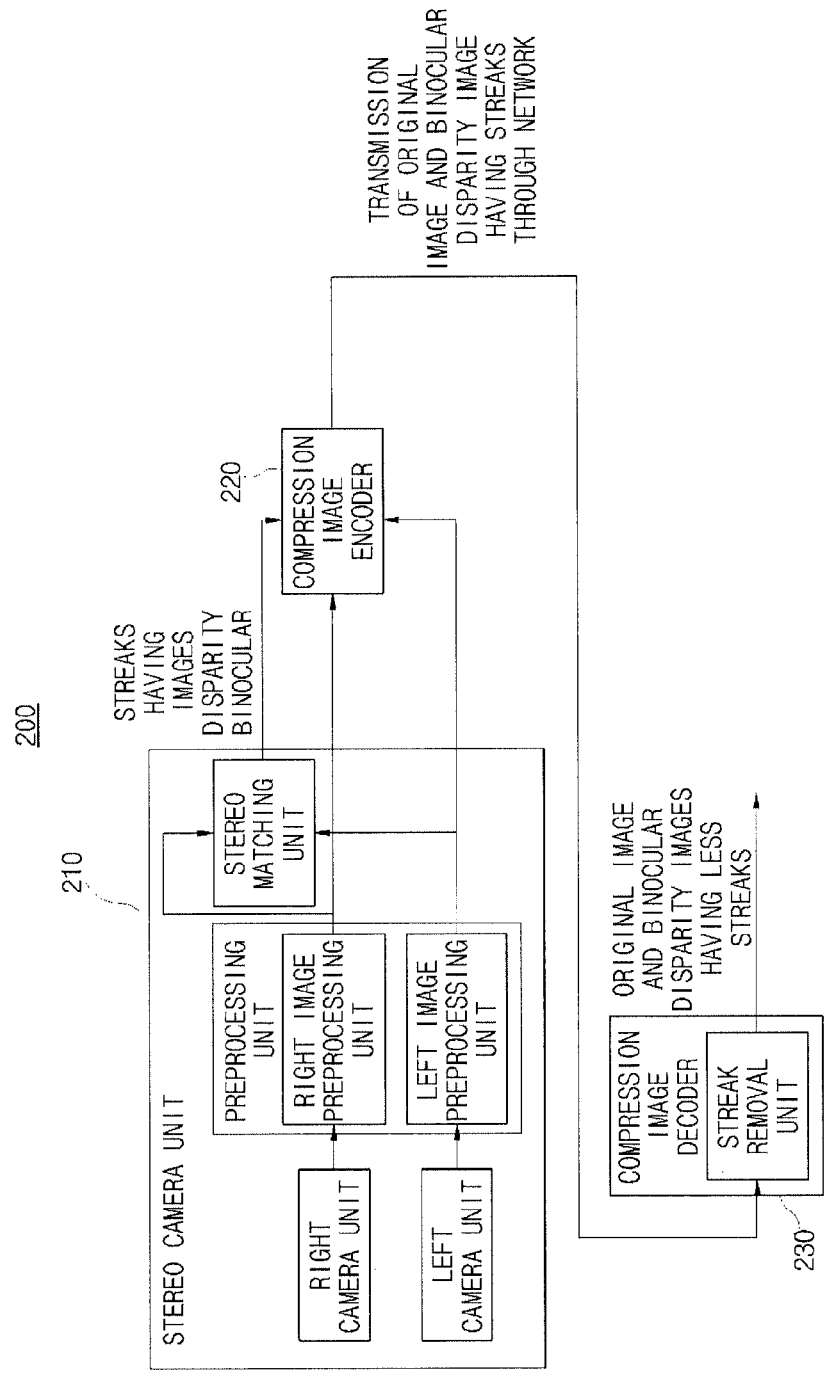
FIG. 13 is a block diagram showing a device for improving stereo matching results according to another exemplary embodiment of the present invention.

FIG. 13 is a block diagram showing a device for improving stereo matching results according to another exemplary embodiment of the present invention.

Referring to FIG. 13, a device 200 for improving stereo matching results according to another exemplary embodiment of the present invention includes a stereo camera unit 210, a compression image encoder 220, and a compressing image decoder 230.

In the case where an output result of a stereo camera system should be transmitted through a network having a limited band width such as a wireless LAN or a USB, etc., it is preferable that an image be transmitted in a compressed form without duplicated data. In this case, the DCT 120 in the exemplary embodiment of FIG. 6 may correspond to the compression image encoder 220 including a DCT of FIG. 13, and the streak removal unit 150 of FIG. 6 may correspond to the compression image decoder 230 for decoding compressed images.

Since the streak estimation unit 130 in the exemplary embodiment of FIG. 6 is necessary only in the case of finding an optimal condition during design of the stereo camera unit 210, the streak estimation unit 130 can be omitted in the exemplary embodiment of FIG. 13.

The compression image encoder 220 is a moving image hardware encoder of a standard such as MPEG2, MPEG4, H.263, etc., or a JPEG encoder, and receives a frame image obtained by combining a binocular disparity image having streaks with a preprocessed right image or a preprocessed left image. The compression image encoder 220 generates a bit stream by applying the discrete cosine transform to every 8 by 8 blocks of the input frame image, quantizing DCT coefficients, and performing a variable length encoding process on the quantized DCT coefficients, and outputs the bit stream.

The compression image decoder 230 generates the DCT coefficients by performing variable length decoding on the compressed image bit stream transmitted through a network and performing de-quantization. The streak removal unit included in the compression image decoder 230 changes AC coefficients, corresponding to a predetermined condition, of the AC coefficients of the blocks in the binocular disparity image region to 0 or a value close to 0. Next, inverse DCT is performed on the changed DCT coefficients, thereby reconstituting an image. Then, an image obtained by applying a de-blocking filter to the boundary of each block in the reconstituted image is output.

If the exemplary embodiment of FIG. 13 is used, the streaks of the binocular disparity image can be removed without degrading the quality of an original image encoded together with the binocular disparity image.

According to the exemplary embodiments of the present invention, in a stereo matching system in which horizontal streak noise occurs, it is possible to relatively estimate the amount of streaks, easily find a condition under which the amount is minimized, and obtain a binocular disparity image having less horizontal streaks according to the condition.

Further, since it is possible to use a discrete cosine transformer (DCT) of a software version used in an image processing field processing still images or moving images or a discrete cosine transformer included in a moving image hardware codec, a process is possible in a low-performance embedded board.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for improving stereo matching results, comprising:
    a stereo camera outputting binocular disparity images between two images preprocessed according to a plurality of preprocessing conditions;
    a discrete cosine transform circuit generating discrete cosine transform (DCT) coefficients by performing discrete cosine transform (DCT) on the binocular disparity images;
    a streak estimation circuit receiving the generated DCT coefficients and estimating amounts of streaks distributed on a screen by using AC coefficients, including streak pattern components in a predetermined direction, of the DCT coefficients;
    a condition estimation circuit estimating a preprocessing condition, corresponding to the smallest amount of streaks of the estimated amounts of streaks, of the plurality of preprocessing conditions, as an optimal condition; and
    a streak removal circuit generating binocular disparity images without the streaks according to the optimal condition by changing predetermined AC coefficients of the DCT coefficients obtained by the discrete cosine transform circuit and performing inverse discrete cosine transform on the changed DCT coefficients.

2. The device of claim 1, wherein the stereo camera outputs the binocular disparity images according to preprocessing conditions based on vertical alignment positions between the two images.

3. The device of claim 1, wherein the stereo camera outputs the binocular disparity images according to the preprocessing conditions including a condition setting an exposure value of one camera with respect to an exposure value of the other camera, and a condition setting a luminance gain of one camera with respect to a luminance gain of the other camera.

4. The device of claim 1, wherein the discrete cosine transform circuit divides the binocular disparity images into blocks of predetermined units, and performs the discrete cosine transform on each of the divided blocks.

5. The device of claim 4, wherein the discrete cosine transform circuit divides the binocular disparity images into either 8 (the number of pixels in a vertical direction) by 8 (the number of pixels in a horizontal direction) block units or 16 (the number of pixels in a vertical direction) by 16 (the number of pixels in a horizontal direction) block units.

6. The device of claim 5, wherein when the binocular disparity images are divided into 8 by 8 block sizes, the streak estimation circuit estimates the amounts of streaks distributed on the screen by using AC coefficients, having the highest frequency components corresponding to streak patterns, of the DCT coefficients.

7. The device of claim 1, wherein the streak removal circuit generates the binocular disparity images without the streaks by changing the AC coefficients to 0 and performing inverse discrete cosine transform on the DCT coefficients.

8. The device of claim 7, further comprising a de-blocking filtering circuit de-blocking block boundaries included in binocular disparity images reconstituted in block units by the inverse discrete cosine transform circuit.

9. The device of claim 1, wherein streak patterns in the predetermined direction are streak patterns in a horizontal direction.

10. A method of improving stereo matching results, comprising:
    outputting binocular disparity images between two images preprocessed according to a plurality of preprocessing conditions;
    generating discrete cosine transform (DCT) coefficients by performing discrete cosine transform (DCT) on the binocular disparity images;
    estimating amounts of streaks distributed on a screen by using AC coefficients, corresponding to streak patterns, of the generated DCT coefficients;
    estimating a preprocessing condition, corresponding to the smallest amount of streaks of the estimated amounts of streaks, of the plurality of preprocessing conditions, as an optimal condition; and
    generating binocular disparity images without the streaks according to the optimal condition by changing the AC coefficients corresponding to the streak patterns and performing inverse discrete cosine transform on the changed DCT coefficients.

11. The method of claim 10, wherein the generating of the DCT coefficients includes
    dividing the binocular disparity images into predetermined block units, and
    performing the discrete cosine transform on each of the divided blocks.

12. The method of claim 11, wherein the dividing of the binocular disparity images into the predetermined block units is dividing the binocular disparity images into 8 (the number of pixels in a vertical direction) by 8 (the number of pixels in a horizontal direction) block units.

13. The method of claim 12, wherein the estimating of the amounts of streaks is estimating the amounts of streaks distributed on a screen by using AC coefficients, having the highest frequency components corresponding to the streak patterns, of the DCT coefficients.

14. The method of claim 10, wherein the generating of the binocular disparity images is generating the binocular disparity images without the streaks by changing the AC coefficients to 0 and performing inverse discrete cosine transform on the DCT coefficients.

15. A system for receiving stereo matching results, comprising:
   a compression image decoder circuit receiving an original image and binocular disparity images having streak patterns as a compressed encoded bit stream, and
   restoring the binocular disparity images with less streak patterns by restoring discrete cosine transform (DCT) coefficients by decoding the bit stream, changing AC coefficients of blocks, corresponding to the binocular disparity images of the restored DCT coefficients, and performing inverse discrete cosine transform on the changed DCT coefficients; and
   a de-blocking filtering circuit de-blocking blocks included in the restored binocular disparity images.

16. The system of claim 15, wherein the compression image decoder circuit restores the binocular disparity images with less streak patterns by changing predetermined AC coefficients to 0, related to streak patterns, of the restored DCT coefficients, and performing the inverse discrete cosine transform on the DCT coefficients.

* * * * *